(12) United States Patent
Jung et al.

(10) Patent No.: US 10,032,404 B2
(45) Date of Patent: Jul. 24, 2018

(54) ELECTRONIC DEVICE AND OPERATING METHOD FOR DISPLAYING AN IMAGE INCLUDING AN IMPERCEIVABLE REGION

(71) Applicant: Samsung Electronics Co., Ltd., Gyeonggi-do (KR)

(72) Inventors: Hansub Jung, Gyeonggi-do (KR);
Kyoungmo Kim, Gyeonggi-do (KR);
Dongwook Kang, Seoul (KR);
Wansang Park, Seoul (KR); Cheehoon Lee, Incheon (KR); Seongji Jang, Busan (KR)

(73) Assignee: Samsung Electronics Co., Ltd (KR)

( * ) Notice: Subject to any disclaimer, the term of this patent is extended or adjusted under 35 U.S.C. 154(b) by 4 days.

(21) Appl. No.: 14/533,780

(22) Filed: Nov. 5, 2014

(65) Prior Publication Data

US 2015/0124009 A1     May 7, 2015

(30) Foreign Application Priority Data

Nov. 5, 2013   (KR) ........................ 10-2013-0133706

(51) Int. Cl.
G09G 3/20        (2006.01)
G09G 3/3225      (2016.01)
G01J 1/32        (2006.01)

(52) U.S. Cl.
CPC ......... *G09G 3/2007* (2013.01); *G09G 3/3225* (2013.01); *G01J 1/32* (2013.01); *G09G 2320/0238* (2013.01); *G09G 2320/0271* (2013.01); *G09G 2320/066* (2013.01);
(Continued)

(58) Field of Classification Search
None
See application file for complete search history.

(56) References Cited

U.S. PATENT DOCUMENTS

2004/0095472 A1*  5/2004  Yoshida ............... H04N 5/2355
                                            348/208.12
2005/0179706 A1   8/2005  Childers
2007/0176916 A1   8/2007  Choe et al.
(Continued)

FOREIGN PATENT DOCUMENTS

KR    10-1158852       6/2012
KR    1020120055990    6/2012
WO    WO 2013/044245   3/2013

OTHER PUBLICATIONS

Yeong-Kang Lai et al., Content-Based LCD Backlight Power Reduction with Image Contrast Enhancement using Histogram Analysis, Journal of Display Technology, Oct. 2011.
(Continued)

*Primary Examiner* — Chad Dicke
(74) *Attorney, Agent, or Firm* — The Farrell Law Firm, P.C.

(57) ABSTRACT

An electronic device having a display function and operating method therefor are provided, which display a transformed image based on image processing information, in order to reduce current normally consumed in displaying regions of an original image that are not perceivable to a user. The method includes obtaining an image to be displayed; determining image processing information of the electronic device; transforming the image based on the image processing information; and displaying the transformed image.

19 Claims, 11 Drawing Sheets

(52) U.S. Cl.
CPC ............ *G09G 2320/0626* (2013.01); *G09G 2330/021* (2013.01); *G09G 2360/144* (2013.01)

(56) References Cited

U.S. PATENT DOCUMENTS

| | | | |
|---|---|---|---|
| 2009/0002401 A1 | 1/2009 | Barnhoefer et al. | |
| 2010/0103186 A1* | 4/2010 | Luengen | G06F 3/14 345/589 |
| 2010/0201709 A1* | 8/2010 | Yang | H04N 21/44008 345/629 |
| 2013/0271514 A1* | 10/2013 | Ha | G09G 3/32 345/694 |
| 2014/0232709 A1 | 8/2014 | Dunn et al. | |

OTHER PUBLICATIONS

Byungseok Min et al., Quantitative Image Quality Evaluation for Mobile Display in Outdoor Environment, IEEE 2nd Global Conference on Consumer Electronics (GCCE), Oct. 2013.
International Search Report dated Jan. 30, 2015 issued in counterpart application No. PCT/KR2014/010591.
European Search Report dated Apr. 4, 2017 issued in counterpart application No. 14860962.1-1914, 12 pages.

* cited by examiner

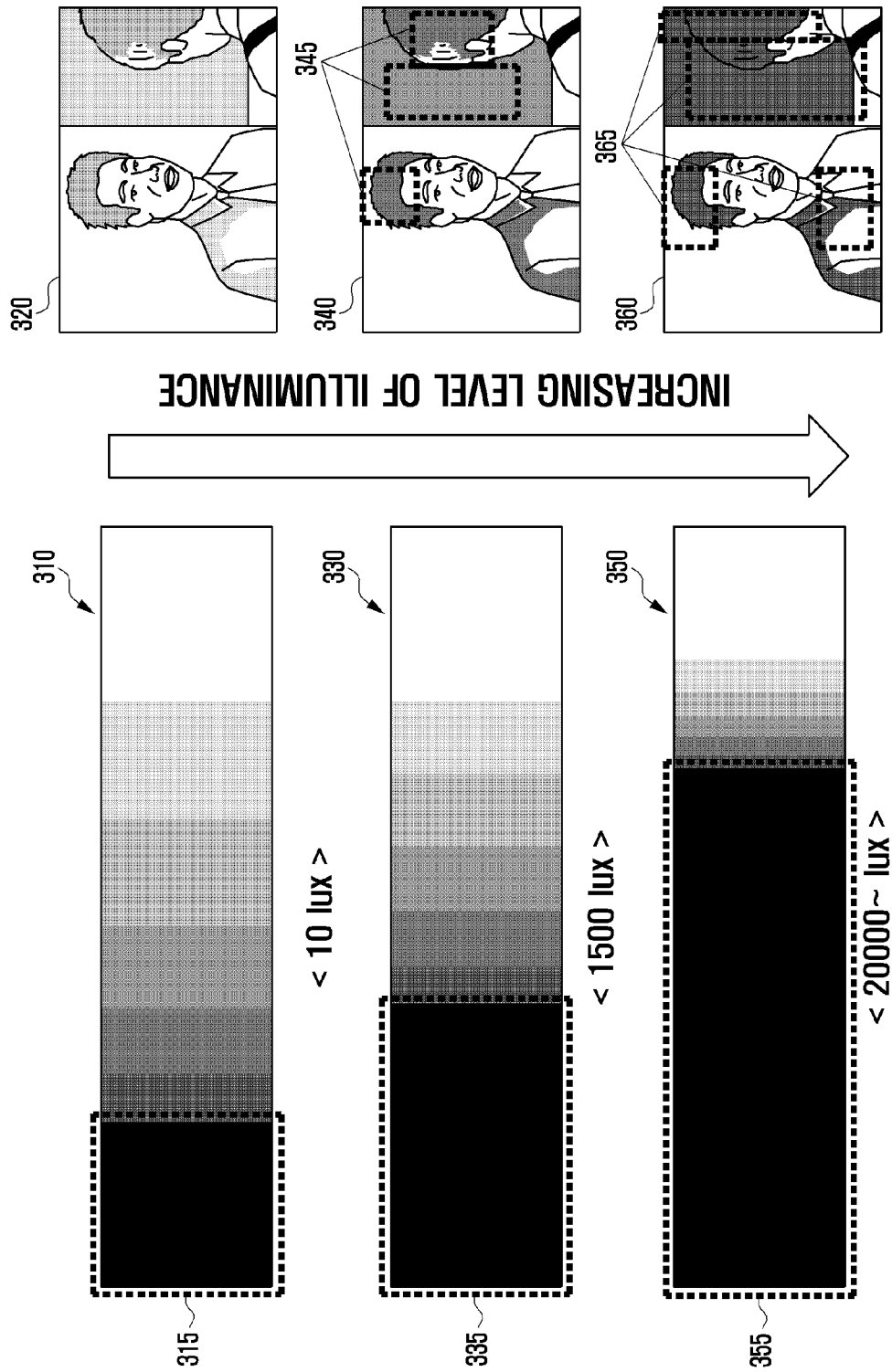

FIG. 3B
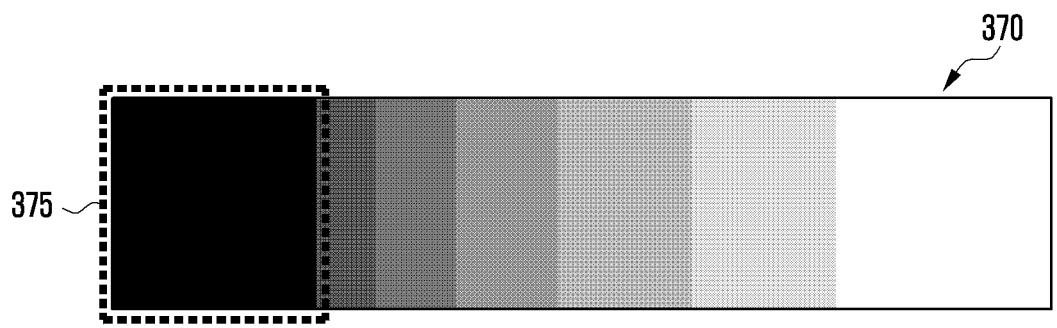
SCREEN BRIGHTNESS : 300nit
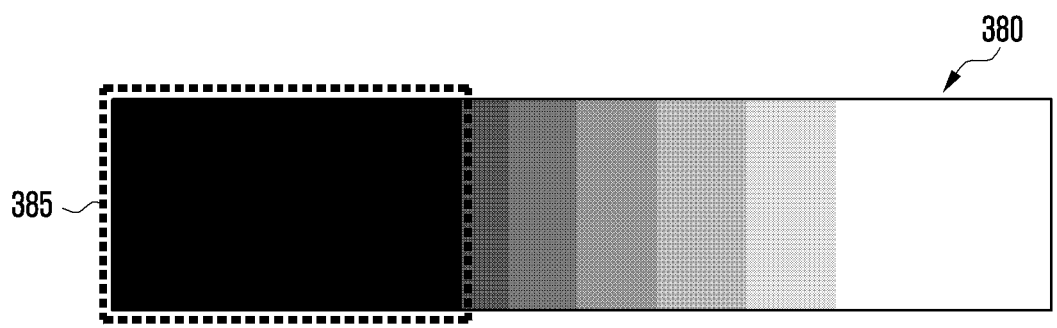
SCREEN BRIGHTNESS: 100nit
SCREEN BRIGHTNESS : 20nit

ELECTRONIC DEVICE AND OPERATING METHOD FOR DISPLAYING AN IMAGE INCLUDING AN IMPERCEIVABLE REGION

PRIORITY

This application claims priority under 35 U.S.C. § 119(a) to Korean Patent Application Serial No. 10-2013-0133706, which was filed in the Korean Intellectual Property Office on Nov. 5, 2013, the entire disclosure of which is hereby incorporated by reference.

BACKGROUND

1. Field of the Invention

The present invention relates generally to an electronic device having a display function, and more particularly, to an electronic device and operating method therefor in which the display function is performed using image processing information in order to reduce current consumption.

2. Description of the Related Art

Recent advances in digital technologies have resulted in the development of various types of electronic devices supporting communication and personal information processing, such as mobile communication terminals, Personal Digital Assistants (PDAs), electronic notes, smartphones, and tablet computers. In particular, high-end electronic devices have evolved into mobile convergence devices supporting heterogeneous functions, which originated from distinct fields. For example, a high-end electronic device may support various functions related to calls (voice call and video call), messages (Short Message Service (SMS), Multimedia Message Service (MMS), electronic mail, etc.), navigation, image capture, broadcast reception and display, media playback (video and music), Internet, instant messengers, and Social Networking Services (SNSs).

For the display function of an electronic device, the contrast ratio generally refers to a ratio of the luminance of the brightest white to that of the darkest black that the electronic device can produce. For example, when an electronic device has a contrast ratio of 1000:1, this indicates that the difference between the brightest screen and the darkest screen that the electronic device can produce may be large. The contrast ratio is more influenced by dark colors than by bright colors. When the contrast ratio is high, colors can be easily and clearly distinguished. Hence, the contrast ratio supported by an electronic device may have a strong influence on the overall quality, such as visibility, perceived by a user viewing an image displayed the screen of the electronic device.

The contrast ratio perceived by the user may vary in the presence of light from surroundings or ambient illumination, and hence, the visibility of the screen produced by an electronic device may vary. For example, the same screen may appear to be brighter in a darker viewing environment (e.g., at night) and may appear to be darker in a brighter viewing environment (e.g., in daylight). When the perceived contrast ratio is decreased due to ambient illumination, the brightness range not perceived by the user (e.g., an imperceivable region) may increase.

Schemes to improve visibility in the presence of ambient light from surroundings (e.g., automatically changing screen brightness according to ambient illumination) have been proposed for electronic devices. However, such schemes consider only factors to improve visibility to the user, but fail to consider current consumption of the electronic device caused by the attempted improvement of the visibility.

SUMMARY

An aspect of the present invention is to address at least the above mentioned problems and/or disadvantages and to provide at least the advantages described below.

Accordingly, an aspect of the present invention is to provide an electronic device and operating method therefor, which support a display function in an effective manner.

Another aspect of the present invention is to provide an electronic device and operating method therefor, which can divide images into regions perceivable by the user and regions imperceivable by the user, based on image processing information, in order to minimize current consumption in the imperceivable regions.

Another aspect of the present invention is to provide an electronic device and operating method therefor, which perform image transformation to identify imperceivable regions according to at least one of illuminance, screen brightness, and image attributes, and display the imperceivable regions based on the at least one of the illuminance, the screen brightness, and the image attributes.

Another aspect of the present invention is to provide an electronic device and operating method therefor, which transform images to be displayed, based on image processing information, and display the transformed images, so that visibility can be maintained in consideration of user perception in consideration of the image processing information, thereby minimizing current consumption in the imperceivable regions.

Another aspect of the present invention is to provide an electronic device and operating method therefor, which black out imperceivable regions not perceived by the user due to ambient illuminance, thereby reducing current consumption in the imperceivable regions.

Another aspect of the present invention is to provide an electronic device and operating method therefor, which that black out regions not perceived by the user according to a preset screen bright level, thereby reducing current consumption in the imperceivable regions.

Another aspect of the present invention is to provide an electronic device and operating method therefor, which can determine a level of image transformation in consideration of both a detected illuminance level and a preset screen brightness level, and can black out regions not perceived by the user based on the level of image transformation, thereby reducing current consumption in the imperceivable regions.

Another aspect of the present invention is to provide an electronic device and operating method therefor, which recognize an optimum environment to support a display function to thereby enhance user convenience and device usability.

In accordance with an aspect of the present invention, a method for display operation in an electronic device is provided. The method includes obtaining an image to be displayed; determining image processing information of the electronic device; transforming the image based on the image processing information; and displaying the transformed image.

In accordance with another aspect of the present invention, a method for display operation in an electronic device is provided. The method includes initiating an image display mode; obtaining an original image while in the image display mode; identifying a level of illuminance; determining whether to transform the original image based on the identified level of illuminance; and upon determining to transform the original image, determining an imperceivable region in the original image according to the level of illuminance, blacking out the imperceivable region, and outputting a transformed image including the blacked out the imperceivable region of the original image.

In accordance with another aspect of the present invention, a non-transitory computer readable storage medium is provided for storing a program that implements the above-described method on a processor.

In accordance with another aspect of the present invention, a non-transitory computer readable storage medium is provided for storing a program, which when executed, controls an electronic device to obtain an image, obtain image processing information to be used for the image, transform the image based on the image processing information, and output the transformed image.

In accordance with another aspect of the present invention, an electronic device is provided. The electronic device includes a display unit configured to display an image; and a control unit configured to obtain image processing information to be used for displaying the image, to transform the image based on the image processing information, and to display the transformed image.

In accordance with another aspect of the present invention, an electronic device is provided. The electronic device includes a display unit configured to display an image; an illumination sensor configured to measure a level of illuminance; a communication unit configured to perform communication for the electronic device; a storage unit configured to store one or more programs; and one or more processors to execute the one or more programs. The one or more programs include a program, which when executed, controls the one or more processors to obtain an original image from the storage unit or through the communication unit upon an initiation of an image display mode, identify the level of illuminance using the illumination sensor during the image display mode, determine whether to transform the original image based on the identified level of illuminance, and upon determining to transform the original image, to determine an imperceivable region of the original image according to the level of illuminance, to black out the imperceivable region of the original image, and to display a transformed image including the blacked out imperceivable region of the original image on the display unit.

Hereinabove, the features and advantages of the present invention are described in a relatively broad perspective to help those skilled in the art understand the present invention. Other features and advantages constituting the subject matter of the present invention will be more apparent from the following detailed description.

BRIEF DESCRIPTION OF THE DRAWINGS

The above and other aspects, features, and advantages of certain embodiments of the present invention will be more apparent from the following detailed description taken in conjunction with the accompanying drawings, in which:

FIGS. 3A and 3B illustrate image transformation based on image processing information according to an embodiment of the present invention;

DETAILED DESCRIPTION OF EMBODIMENTS OF THE INVENTION

Figure 1:
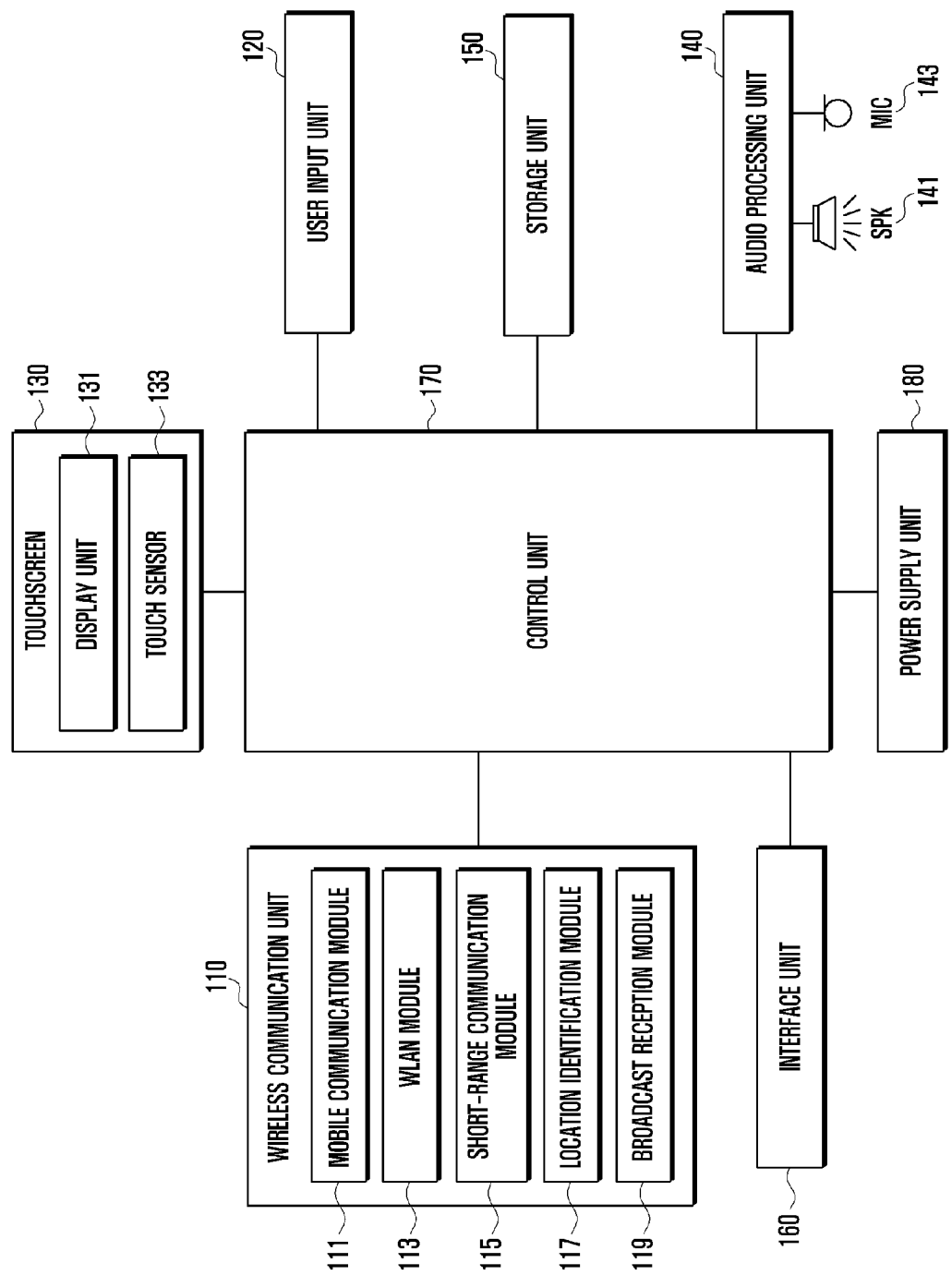
FIG. 1 is a block diagram illustrating an electronic device according to an embodiment of the present invention.

Hereinafter, various embodiments of the present invention are described in detail with reference to the accompanying drawings. The same reference symbols are used throughout the drawings to refer to the same or like parts. The following description includes various specific details to assist in that understanding, which are to be regarded as merely exemplary. Further, descriptions of well-known functions and constructions may be omitted for clarity and conciseness.

Various embodiments of the present invention relate to an electronic device that provides a display function and an operating method therefor, which apply image transformation to images to be displayed according to image processing information and output the transformed images, thereby reducing current consumed in regions of the images with a brightness level that is not recognizable by the user (i.e., imperceivable regions).

The image processing information may include environmental information, image attribute information, user setting information, etc. Examples of the environmental information include information regarding illuminance, infrared radiation, and ultraviolet radiation. Examples of the image attribute information include information indicating whether the image is a moving image, still image, gaming image, image being scrolled, or the like. Examples of the user setting information include information on a level of screen brightness and a level of image transformation, which may be set in advance by the user. In the following description, although illuminance and screen brightness are used as representative examples of image processing information, other information elements may also be used as image processing information.

In accordance with an embodiment of the present invention, image transformation may be performed by distinguishing regions of images that can be perceived by the user (i.e., perceivable regions) from regions of the images that cannot be perceived by the user (i.e., imperceivable regions) according to changes of contrast ratio due to the influence of illuminance and/or screen brightness, and blacking out the imperceivable regions according to the image processing information. For example, after identifying the imperceivable regions, these regions are displayed in black.

In accordance with another embodiment of the present invention, images are transformed based on image processing information in order to minimize unnecessary current that is consumed by displaying imperceivable regions, while maintaining screen visibility to the user. For example, the electronic device may reduce current consumption during display operations while maintaining screen visibility based on a perceived contrast ratio of images on the screen in the presence of environmental influence, such as ambient illumination. In general, as the level of illumination rises, the perceived contrast ratio of images on the screen lowers. When the contrast ratio perceived by the user is lowered due to increased illuminance, the regions with a brightness level not recognizable by the user (i.e., imperceivable regions) may be expanded. In accordance with an embodiment of the present invention, imperceivable regions of images to be displayed may be blacked out in order to minimize current normally consumed by displaying these imperceivable regions.

FIG. 1 is a block diagram illustrating an electronic device according to an embodiment of the present invention.

Referring to FIG. 1, the electronic device includes a wireless communication unit 110, a user input unit 120, a touchscreen 130, an audio processing unit 140, a storage unit 150, an interface unit 160, a control unit 170, and a power supply unit 180. The electronic device may include one or more units not illustrated in FIG. 1, and one or more units illustrated in the electronic device in FIG. 1 may be removed or replaced. For example, when the electronic device supports image capture, a camera module may also be included therein. Further, when the electronic device does not support broadcast reception and playback, the broadcast reception module 119 of the wireless communication unit 110 may be omitted therefrom.

The wireless communication unit 110 may include one or more modules that support wireless communication between the electronic device and a wireless communication system or between the electronic device and another electronic device. The wireless communication unit 110 includes a mobile communication module 111, a wireless local area network (WLAN) module 113, a short-range communication module 115, a location identification module 117, and a broadcast reception module 119.

The mobile communication module 111 sends and receives radio signals to and from at least one of a base station, an external terminal, and a server (such as an integration server, provider server, content server, Internet server, or cloud server) on a mobile communication network. The radio signals may carry various types of data in relation to voice calls, video calls, and text or multimedia messages.

The mobile communication module 111 may receive one or more images, which are a target for image transformation or processing. The mobile communication module 111 may also receive images from another electronic device or a server connected with the electronic device through a network (such as a mobile communication network).

In response to a user request, the mobile communication module 111 may send and receive data mapped with contrast ratios (e.g., a gamma correction table or profile) corresponding to various image processing information (e.g., environmental information, image attribute information, and user setting information) for use in a display operation of the electronic device to and from an external entity (such as a server or external electronic device).

The WLAN module 113 may be used to wirelessly access the Internet and to establish a WLAN link to another electronic device. The WLAN module 113 may be a built-in module or a removable module. Wireless Internet access may be achieved through Wi-Fi, Wireless broadband (WiBro), Worldwide Interoperability for Microwave Access (WiMAX), or High Speed Downlink Packet Access (HSDPA).

The WLAN module 113 may send user input data to an external device or receive data from an external device through a messenger application. The WLAN module 113 may receive one or more images for image transformation or processing. The WLAN module 113 may receive images from another electronic device or a server connected with the electronic device through a network (such as wireless Internet).

In response to a user request, the WLAN module 113 may send and receive data for use in a display operation of the electronic device (e.g., a gamma correction table) to and from an external entity (such as a server).

When a WLAN link to a different electronic device is established, the WLAN module 113 may send and receive various data (such as an image, a moving image, a music file, and a gamma correction table) to and from the different electronic device according to user selection. The WLAN module 113 may always be on or may be turned on according to user settings or user input.

The short-range communication module 115 is used to support short-range communication. Short-range communication may be provided through Bluetooth, Bluetooth low energy (BLE), Radio Frequency Identification (RFID), Infrared Data Association (IrDA), Ultra Wideband (UWB), ZigBee, or Near Field Communication (NFC).

The short-range communication module 115 may receive one or more images for image transformation or processing. The short-range communication module 115 may receive images from another electronic device connected with the electronic device through a network (such as short-range communication).

When a short-range communication link to a different electronic device is established, the short-range communication module 115 may send and receive various data (such as an image, a moving image, a music file, and a gamma correction table) to and from the different electronic device according to user selection. The short-range communication module 115 may always be on or may be turned on according to user settings or user input.

The location identification module 117 is used to identify the location of the electronic device. For example, the location identification module 117 may be a Global Positioning System (GPS) module. The location identification module 117 may compute the latitude, longitude and altitude of the current location by applying triangulation to distance and time information received from three or more base stations. The location identification module 117 may also identify the current location by use of signals received in real time from three or more satellites.

Location information of the electronic device may be obtained in various ways.

The broadcast reception module 119 may receive a broadcast signal (e.g., a TV broadcast signal, radio broadcast signal or data broadcast signal) and associated information (e.g., information regarding broadcast channels, broadcast programs and broadcast service providers) from an external broadcasting server through a broadcast channel (e.g., a satellite channel or a terrestrial channel).

The user input unit 120 generates an input signal for controlling the electronic device corresponding to user manipulation. The user input unit 120 may include a keypad, a dome switch, a touchpad (resistive or capacitive), a jog shuttle, and sensors (such as a voice recognition sensor, proximity sensor, illumination sensor, acceleration sensor, gyro sensor, geomagnetic sensor, color sensor, temperature sensor, and motion recognition sensor).

The user input unit 120 may include physical buttons formed on the exterior of the electronic device and virtual buttons on a touch panel. The user input unit 120 may receive user input for manipulating the electronic device and generate an input signal corresponding to the user input. For example, the user input unit 120 may receive user input for applying image transformation (e.g., blacking out imperceivable regions) according to image processing information (e.g., illuminance and screen brightness) and generate an input signal corresponding to the user input.

In accordance with an embodiment of the present invention, a user manipulates the user input unit 120 to raise a level of image transformation at an outdoor site with a high illuminance; and the user manipulates the user input unit 120 to lower the level of image transformation at an indoor site with a low illuminance. The level of image transformation may indicate, for example, the size of the region of an image to be blacked out in consideration of visibility of the image to the user.

For example, in a poorly lighted room with illuminance of 0 to 800 lux and an ultraviolet (UV) index of 0, the level of image transformation may be set to be low. Being outside on a cloudy afternoon with illuminance of 3000 to 4000 lux, the level of image transformation may be set to be medium. Being outside on a sunny afternoon with illuminance of 40000 lux or more, the level of image transformation may be set to be high.

The touchscreen 130 supports both an input function and a display function, and includes a display unit 131 and a touch sensor 133. The display unit 131 of the touchscreen 130 is used to display various screens of the electronic device, such as an instant messenger screen, a call handling screen, a gaming screen, a video playback screen, a gallery screen, a webpage screen, a home screen, etc.

When a user touch event is detected by the touch sensor 133 while a specific screen is displayed on the display unit 131, the touchscreen 130 may send an input signal corresponding to the touch event to the control unit 170, which may then identify the touch event and control an operation according to the touch event. For example, the touchscreen 130 receives a user input or touch event for image transformation while displaying a video playback screen, and displays the video playback screen based on the images that are transformed to an extent indicated by the user input (e.g., imperceivable regions of the images are blacked out) under control of the control unit 170.

The display unit 131 displays or outputs information processed by the electronic device. For example, when the electronic device is in a call handling mode, the display unit 131 may display a user interface (UI) or graphical user interface (GUI) for call handling. When the electronic device is in a video call mode or capture mode, the display unit 131 may output a UI or GUI for displaying received or captured images. The display unit 131 may display the screen in a landscape mode or portrait mode and may switch between landscape mode and portrait mode according to rotation or placement of the electronic device.

The display unit 131 may be realized using one or more display techniques based on liquid crystal display (LCD), thin film transistor liquid crystal display (TFT-LCD), light emitting diodes (LED), organic light emitting diodes (OLED), active matrix OLEDs (AMOLED), flexible display, bendable display, and 3D display. The display unit 131 may also use a transparent display technology so as to be seen from the outside.

According to an embodiment of the present invention, the display operation method for the electronic device may be applied to a variety of display types. For example, the display operation method may reduce a high amount current when applied to an emissive display such as an AMOLED display whose individual pixels emit light. Hence, the display unit 131 may be realized using an emissive display whose individual pixels emit light.

The touch sensor 133 may be placed on the display unit 131 and may sense user input of touching the surface of the touchscreen 130 or hovering thereon. Here, user touch input may correspond to a touch event such as tap, drag, sweep, flick, drag and drop, drawing, single touch, multi touch or handwriting. When a user touch event is detected on the touchscreen 130, the touch sensor 133 identifies the coordinates of the touch point and sends the coordinates to the control unit 170. That is, when user input is detected on the surface of the touchscreen 130, the touch sensor 133 generates an input signal corresponding to the user input and sends the input signal to the control unit 170, which may then perform a function according to the area in which the user input is generated.

The touch sensor 133 may receive user input for initiating the display function of the present invention and generate an input signal corresponding to the user input. For example, the touch sensor 133 may receive user input for applying image transformation (e.g., blacking out imperceivable regions (imperceivable regions are displayed in black)) according to image processing information (e.g., illuminance and/or screen brightness) and may generate an input signal corresponding to the user input.

The touch sensor 133 converts a pressure change or capacitance change detected at a site of the display unit 131 into an electrical signal. The touch sensor 133 may sense the position and area of user touch input and may also sense pressure caused by touch input according to a touch technique employed.

Upon detection of a user input, the touch sensor 133 may send a corresponding electrical signal to a touch controller (not shown). The touch controller may process the received electrical signal and send data corresponding to the processed result to the control unit 170. Accordingly, the control unit 170 may identify a touch point on the touchscreen 130.

The audio processing unit 140 may send an audio signal from the control unit 170 to a speaker 141, and may send an audio signal such as a voice signal from a microphone 143 to the control unit 170. Under control of the control unit 170, the audio processing unit 140 may convert voice or audio data into an audio signal and output the audio signal through the speaker 141, and may convert an audio signal such as a voice signal from the microphone 143 into a digital signal and send the digital signal to the control unit 170.

The speaker 141 is used to output audio, e.g., audio data received through the wireless communication unit 110 or stored in the storage unit 150, and sound effects related to functions being executed (e.g., instant messaging, image display, image transformation, call handling, image capture, content file playback, etc.).

The microphone 143 may be used to receive audio from the outside and convert the audio into electrical audio data. For example, during a call, the processed audio data may be converted into a format transmittable to a base station through the mobile communication module 111. Further, the microphone 143 may implement a variety of noise removal algorithms to remove noise occurring while receiving an audio signal from the outside.

The storage unit 150 may store programs executable by the control unit 170, and may store input/output data such as messenger data like conversation data, contact information (fixed or mobile telephone numbers), messages, and media content (audio, video and images).

For example, the storage unit 150 may store a display support program used to obtain original images from the storage unit 150 or through the wireless communication unit 110 (e.g., the mobile communication module 111, WLAN module 113, short-range communication module 115, or broadcast reception module 119) according to the initiation of an image display mode, to measure illuminance using an illumination sensor during the image display mode, to determine whether to apply image transformation to the original images based on the measured illuminance, to identify imperceivable regions in the original images, upon determining to apply image transformation, to black out the imperceivable regions of the original images, and to display the images transformed through blacking out on the display unit 131. The storage unit 150 may also store a program used to determine the level of image transformation based on a measured illuminance, to identify screen brightness, to adjust the level of image transformation according to the screen brightness, and to identify imperceivable regions in the original images in consideration of the adjusted level of image transformation.

The storage unit 150 may store one or more images to be transformed or processed. The storage unit 150 may store transformed images, image processing information (e.g., illuminance and/or screen brightness), and levels of image transformation corresponding to the image processing information. The storage unit 150 may store information on various contrast ratios perceived by the user according to image processing information, and store a table containing mappings between contrast ratios and levels of image transformation (e.g., a gamma correction table).

The storage unit 150 may store information on usage frequencies, importance and priorities of applications and content. The storage unit 150 may store information on various patterns of vibrations and sound effects output in response to touch input on the touchscreen 130. The storage unit 150 may temporarily or semi-permanently store an operating system (OS) of the electronic device, programs supporting input and display operations of the touchscreen 130, programs supporting image transformation based on image processing information and display of transformed images, and data generated during program execution.

The storage unit 150 may include one or more of various types of storage media, such as flash memory, a hard disk, a multimedia or other memory card (e.g., micro, SD, or XD), Dynamic Random Access Memory (DRAM), Static Random Access Memory (SRAM), Read Only Memory (ROM), Programmable Read-Only Memory (PROM), Electrically Erasable Programmable Read-Only Memory (EEPROM), magnetic memory (MRAM), magnetic disk, and optical disc. The storage unit 150 may function in cooperation with a Web storage over the Internet.

The interface unit 160 may be used as an interface for connecting an external appliance to the electronic device. The interface unit 160 may be used to receive data or power from an external appliance and to send internal data to the external appliance. For example, the interface unit 160 may include a wired/wireless headset port, a charger port, a wired/wireless data port, a memory card port, a port for a device with an identification module, an audio input/output port, a video input/output port, and an earphone port.

The control unit 170 may control the overall operation of the electronic device. For example, the control unit 170 may control operations related to voice communication, data communication, and video communication. The control unit 170 may include a data processing module (not shown) to perform image transformation according to image processing information and display the transformed images. The control unit 170 may include one or more processors that can execute one or more programs stored in the storage unit 150 to control image transformation based on image processing information (e.g., illuminance and/or screen brightness).

In accordance with an embodiment of the present invention, the control unit 170 may obtain images to be displayed on the display unit 131 from an internal component or external entity in response to user input. The control unit 170 may obtain image processing information (e.g., illuminance and/or preset screen brightness) to be used to process or transform the images. The control unit 170 may determine whether to perform image transformation based on the image processing information, and may determine the level of image transformation to be applied to the images, upon determining to perform image transformation.

The control unit 170 may compare the image processing information with preset thresholds (ranges or intervals) for determining whether to apply image transformation (e.g., values corresponding to various levels of illuminance (and/or screen brightness)). The control unit 170 may determine to apply image transformation when the image processing information matches the preset thresholds. For example, when regions not perceived by the user (i.e., imperceivable regions) are present in the images at a given illuminance level, the control unit 170 may determine to apply image transformation and black out the imperceivable regions.

The level of image transformation may indicate the amount of transformation to be applied to a given image while maintaining visibility of the image to the user. The control unit 170 may transform the image (e.g., blacking out imperceivable regions of the image) according to the level of image transformation determined based on, for example, the illuminance level.

In applying image transformation, the control unit 170 may further consider user setting information. For example, the control unit 170 may adjust the level of image transformation according to preset screen brightness for the display unit 131.

The control unit 170 may also determine the level of image transformation in consideration of multiple items of the image processing information. For example, the control unit 170 may determine the level of image transformation according to first image processing information (e.g., illuminance or screen brightness) and may then adjust the level of image transformation according to second image processing information (e.g., screen brightness or illuminance).

The control unit 170 may also determine the level of image transformation at one time in consideration of first and second image processing information.

After image transformation, the control unit 170 may control the display unit 131 to display the transformed images. That is, the control unit 170 may control an operation so that imperceivable regions of the images, which are determined based on illuminance, are blacked out. For example, the control unit 170 may shut off power supplied to pixels of the display unit 131 corresponding to the imperceivable regions.

In accordance with an embodiment of the present invention, for given images (obtained from an internal component or an external entity), the control unit 170 may determine whether to apply image transformation based on one or more pieces of information, transform the images according to the determination result, and display the transformed images.

For example, the control unit 170 may obtain environmental information related to ambient illumination, ultraviolet rays, and infrared rays by use of an illumination sensor, ultraviolet sensor, and infrared sensor. The control unit 170 may obtain image attribute information indicating one of image types including a moving image, a still image, a gaming image, and a screen being scrolled by analyzing attributes of images to be processed. An image may correspond to a webpage that is viewable through a web browser or to a page provided by a native program such as a telephony program or word processing program. An image may also correspond to a full screen displayed on the display unit 131 or to a portion of a full screen. The control unit 170 may obtain information on the screen brightness of the display unit 131 and the level of image transformation preset by the user.

In accordance with an embodiment of the present invention, the control unit 170 may determine whether a transformed image corresponding to an image to be displayed is stored. When at least one transformed image corresponding to an image to be displayed is present, the control unit 170 may output the pre-stored transformed image without transforming the image to be displayed. When one or more pre-stored transformed images corresponding to the image to be displayed are present, the control unit 170 may determine whether one of the transformed images matches image processing information (e.g., illuminance level). When a pre-stored transformed image matching the image processing information (e.g., illuminance level) is present, the control unit 170 may control the display unit 131 to display the matching pre-stored transformed image. When a pre-stored transformed image matching the image processing information (e.g., illuminance level) is not present, the control unit 170 may transform the image to be displayed according to the image processing information and control the display unit 131 to display the transformed image.

For example, the user may frequently view images registered in a gallery. In this case, for each image, the control unit 170 may store multiple transformed images according to particular conditions (e.g., multiple illuminance levels) and display one of the transformed images in response to a viewing request for the image, avoiding repeated image transformation. That is, when the user repeatedly selects the same image, the control unit 170 may output a corresponding stored transformed image without performing image transformation requiring current consumption. Hence, it is possible to prevent repeated image transformation for the same image, reducing current consumption and load.

In addition, the control unit 170 may control regular operations of the electronic device. For example, when an application is executed, the control unit 170 may control application execution and screen display for the application. The control unit 170 may receive an input signal corresponding to a touch event generated on a touch-based input interface (such as the touchscreen 130) and control function execution according to the input signal. The control unit 170 may also control transmission and reception of various data carried out through wired or wireless communication.

The power supply unit 180 may supply power from an external or internal power source to the individual components of the electronic device under control of the control unit 170. In particular, the power supply unit 180 may supply or shut off power to individual pixels of the display unit 131 under control of the control unit 170.

According to various embodiments of the present invention, the electronic device may be any electronic appliance including an Application Processor (AP), a Graphics Processing Unit (GPU), and a Central Processing Unit (CPU), such as an information and communication device, multimedia device or applied device. For example, the electronic device may be a mobile communication terminal based on communication protocols supporting various communication systems, a tablet computer, a smartphone, a wearable device (i.e., a smart device that may be worn or put on by a user, such as a wearable phone, a wearable watch, a wearable computer, a wearable camera, wearable shoes, a wearable pendant, a wearable ring, a wearable bracelet, wearable glasses or goggles), a Portable Multimedia Player (PMP), a media player such as an MP3 player, a portable game console, or a PDA. In addition, the function control scheme of the embodiments of the present invention may also be applied to various display devices such as a laptop computer, a Personal Computer (PC), a digital television, Digital Signage (DS), and a Large Format Display (LFD).

Various embodiments of the present invention can be implemented using hardware, software or a combination thereof. Software implementation can be stored in a storage medium readable by a computer or a similar device. Hardware implementation may be achieved using at least one of an Application Specific Integrated Circuit (ASIC), a Digital Signal Processor (DSP), a Digital Signal Processing Device (DSPD), a Programmable Logic Device (PLD), a Field Programmable Gate Array (FPGA), a processor, a controller, a micro-controller, a microprocessor, and an electric unit for providing a specific function.

For example, the storage medium may be a computer readable storage medium storing a program used to obtain original images, obtain image processing information (e.g., illuminance and screen brightness) for the images, determine whether to apply image transformation to the images on the basis of the image processing information, transform the images according to the image processing information, and output the transformed images.

Some embodiments of the present invention may be directly implemented by the control unit 170. Procedures and functions described as embodiments in the present specification may be implemented by software modules. Each software module may perform one or more functions or operations described in the present specification.

Figure 2:
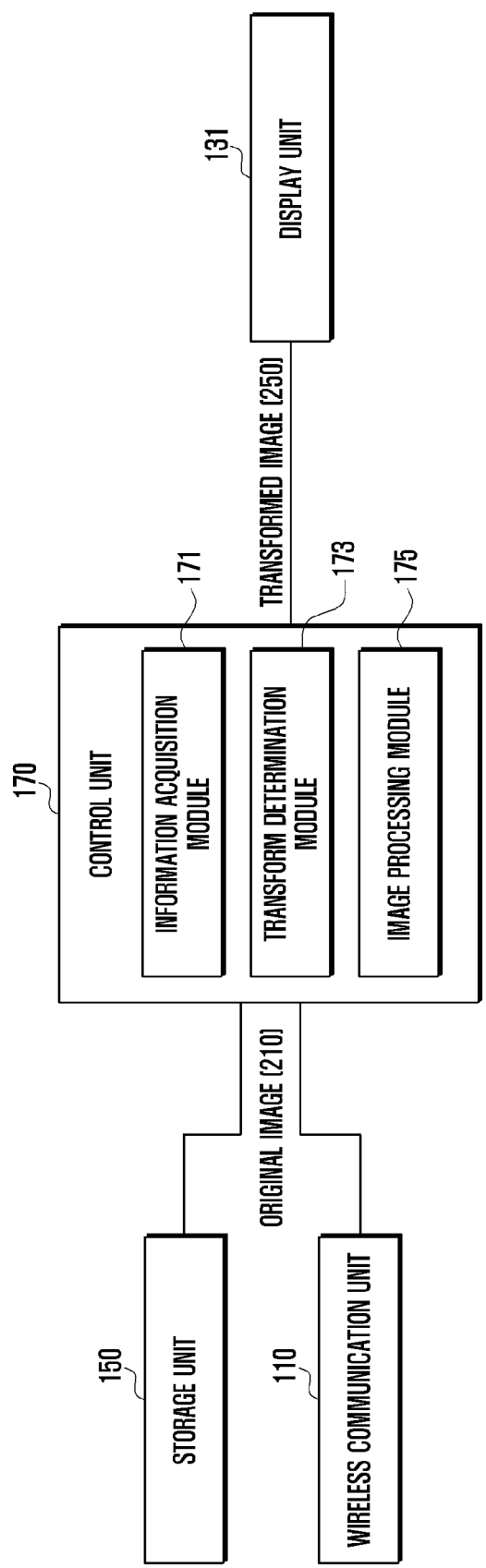
FIG. 2 illustrates display operations performed by an electronic device according to an embodiment of the present invention.

FIG. 2 illustrates operations performed by an electronic device for image processing and display according to an embodiment of the present invention.

Referring to FIG. 2, the control unit 170 of the electronic device obtains an original image 210 from the storage unit 150 or through the wireless communication unit 110 in response to a user input for image display.

The control unit 170 may determine whether to apply image transformation to the original image 210 based on one or more pieces of image processing information, such as environmental information (e.g., illuminance), state information (e.g., screen brightness) or image attribute information. For example, the control unit 170, using an information acquisition module 171, obtains image processing information (e.g., illuminance through an illumination sensor). The control unit 170, using a transform determination module 173, determines whether to transform the original image 210 based on the image processing information (e.g., illuminance).

Upon determining to transform the original image 210, the control unit 170, using image processing module 175, determines the level of image transformation to be applied to the original image 210 (e.g., the region to be blacked out), based on the image processing information (e.g., illuminance). When the illuminance level is high, the control unit 170, using an image processing module 175, raises the level of image transformation; and when the illuminance level is low, the control unit 170, using the image processing module 175, lowers the level of image transformation. For example, when the electronic device is located outside with a high illuminance, the control unit 170, using the image processing module 175, raises the level of image transformation; and when the electronic device is indoors with a low illuminance, the control unit 170, using the image processing module 175, lowers the level of image transformation.

The control unit 170, using the image processing module 175, may increase the region to be blacked out when illuminance is high, and may decrease the region to be blacked out when illuminance is low. For example, in a poorly lit room with illuminance of 0 to 800 lux, the control unit 170, using the transform determination module 173, determines the level of image transformation to be low and decreases the region to be blacked out in a given image. When outside on a cloudy afternoon with illuminance of 3000 to 4000 lux, the control unit 170, using the transform determination module 173, determines the level of image transformation to be medium and increases the region to be blacked out in a given image. When outside on a sunny afternoon with illuminance of 40000 lux or more, the control unit 170, using the transform determination module 173, determines the level of image transformation to be at a maximum and maximizes the region to be blacked out in a given image. In accordance with an embodiment the present invention, the region to be displayed in black (i.e., the imperceivable region or region to be blacked out) may be adjusted by supplying or shutting off power to the corresponding pixels of the display unit 131.

The control unit 170, using the transform determination module 173, identifies a contrast ratio corresponding to the image processing information (e.g., illuminance and screen brightness). The contrast ratio is related to an image displayed on the display unit 131.

The control unit 170, using the transform determination module 173, determines the level of image transformation to be applied to the original image 210, based on the contrast ratio corresponding to the image processing information. For example, the control unit 170, using the transform determination module 173, divides the original image 210 into a perceivable region and an imperceivable region, based on the contrast ratio, and determines the region to be blacked out (i.e., the level of image transformation) in the imperceivable region. For example, the region to be blacked out may be the whole imperceivable region or a portion of the imperceivable region.

Upon determining the level of image transformation to be applied to the original image 210, the control unit 170, using the image processing module 175, transforms the original image 210 accordingly (e.g., blacks out the imperceivable region). Accordingly, the control unit 170, using the image processing module 175, generates a transformed image 250 and outputs the transformed image 250 to the display unit 131. The control unit 170, using the image processing module 175, also stores the transformed image 250 in the storage unit 150.

When the electronic device is outdoors with high illuminance, visibility of a displayed image is lowered because high illuminance acts as noise to the displayed image. In various embodiments of the present invention, the control unit 170 may vary the level of image transformation based on information regarding at least one of illuminance, ultraviolet rays, infrared rays, and location (indoor or outdoor), thereby improving visibility of displayed images to the user.

In addition, the control unit 170 determines whether to apply image transformation to the original image 210 based on user setting information. For example, the control unit 170 may adjust a level of image transformation according to screen brightness of the display unit 131 as preset by the user. That is, the control unit 170 may lower the level of image transformation when the screen brightness is high, and raise the level of image transformation when the screen brightness is low.

As described above, the control unit 170 may vary a level of image transformation according to the screen brightness of the display unit 131, and as such, may lower the level of image transformation when the screen brightness is high because of a user selection or device state, thereby reducing current consumption and improving visibility.

FIGS. 3A and 3B illustrate image transformation based on image processing information according to an embodiment of the present invention. Specifically, FIG. 3A illustrates variation of an imperceivable region in an image displayed on the display unit 131 with variation of illuminance, and FIG. 3B illustrates variation of an imperceivable region in an image displayed on the display unit 131 with variation of screen brightness.

In FIG. 3A, reference numerals 310, 330, and 350 indicate contrast ratios perceived by a user when the illuminance level is 10 lux, 1500 lux, and 20000 lux, respectively. Reference numerals 315, 335, and 355 indicate regions not perceived by the user (i.e., imperceivable regions) at perceived contrast ratios corresponding to the above illuminance levels (i.e., 10 lux, 1500 lux, and 20000 lux).

As illustrated in FIG. 3A, the imperceivable region to be blacked out may vary according to the level of illuminance. That is, the imperceivable region may expand with the increasing level of illuminance. Reference numerals 320, 340, and 360 represent visibility of the same image to the user at the above illuminance levels 10 lux, 1500 lux, and 20000 lux. Further, reference numerals 345 and 365 indicate regions not perceived by the user (i.e., imperceivable regions) in the image displayed on the display unit 131.

As illustrated in FIG. 3A, the perceived contrast ratio of the image on the display unit 131 decreases with the increasing level of illuminance (i.e., 10 lux, 1500 lux, and 20000 lux). As the perceived contrast ratio decreases with the increasing level of illuminance, the regions not perceived by the user (i.e., imperceivable regions 345 and 365) expand.

For example, the imperceivable region 365 in the image 360 at illuminance level 20000 lux is larger than the imperceivable region 345 in the image 340 at illuminance level 1500 lux. When the level of illuminance is high (e.g., a bright room or a sunny outdoor site), a large difference may exist between the image on the display unit 131 and the image perceived by the user because high illuminance acts as noise to the displayed image on the display unit 131, thereby lowering visibility of the image.

As described above, the imperceivable region to be blacked out may vary according to the level of illuminance. The imperceivable region may also vary according to the screen brightness of the display unit 131.

In FIG. 3B, reference numerals 370, 380, and 390 indicate contrast ratios perceived by the user when the preset screen brightness is 300 nit, 100 nit, and 20 nit, respectively. Reference numerals 375, 385, and 395 indicate regions not perceived by the user (i.e., imperceivable regions) at perceived contrast ratios corresponding to the above screen brightnesses 300 nit, 100 nit, and 20 nit.

As illustrated in FIG. 3B, the imperceivable region to be blacked out may vary according to the level of screen brightness. That is, the imperceivable region may expand with the decreasing level of screen brightness.

As illustrated in FIG. 3B, the perceived contrast ratio of the image on the display unit 131 decreases with the decreasing level of screen brightness 300 nit, 100 nit, and 20 nit. As the perceived contrast ratio decreases with the decreasing level of screen brightness, the region not perceived by the user (i.e., an imperceivable region) expands.

For example, the imperceivable region 395 in the image 390 at a screen brightness of 20 nit is larger than the imperceivable region 375 in the image 370 at a screen brightness of 300 nit. When the screen brightness is low, a large difference may exist between the image on the display unit 131 and the image perceived by the user.

Referring to FIGS. 3A and 3B, under the same illuminance condition (e.g., 20000 lux), the imperceivable region may be reduced when the screen brightness is high, and may be expanded when the screen brightness is low. For example, when the level of screen brightness increases, the imperceivable region having been not perceived by the user becomes brighter, and hence, can be perceived by the user.

As described above, the imperceivable region not perceived by the user may vary according to changes in illuminance and/or screen brightness. In accordance with an embodiment of the present invention, the level of image transformation is determined based on preset image processing information (e.g., at least one of illuminance and screen brightness), and the imperceivable region of an image is blacked out according to the determined level of image transformation. Accordingly, it is possible to maintain visibility to the user and reduce current consumed in the imperceivable region under various environmental conditions.

Figure 4:
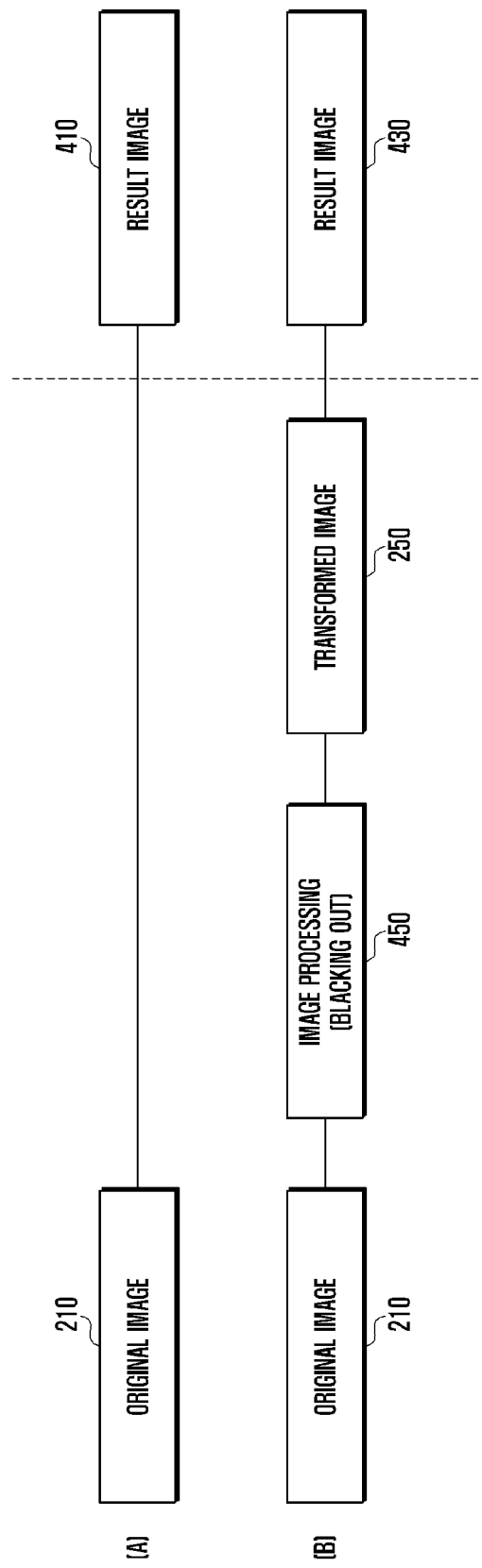
FIGS. 4 and 5 illustrate images as perceived by a user as results of display operations according to an embodiment of the present invention.
Figure 5:
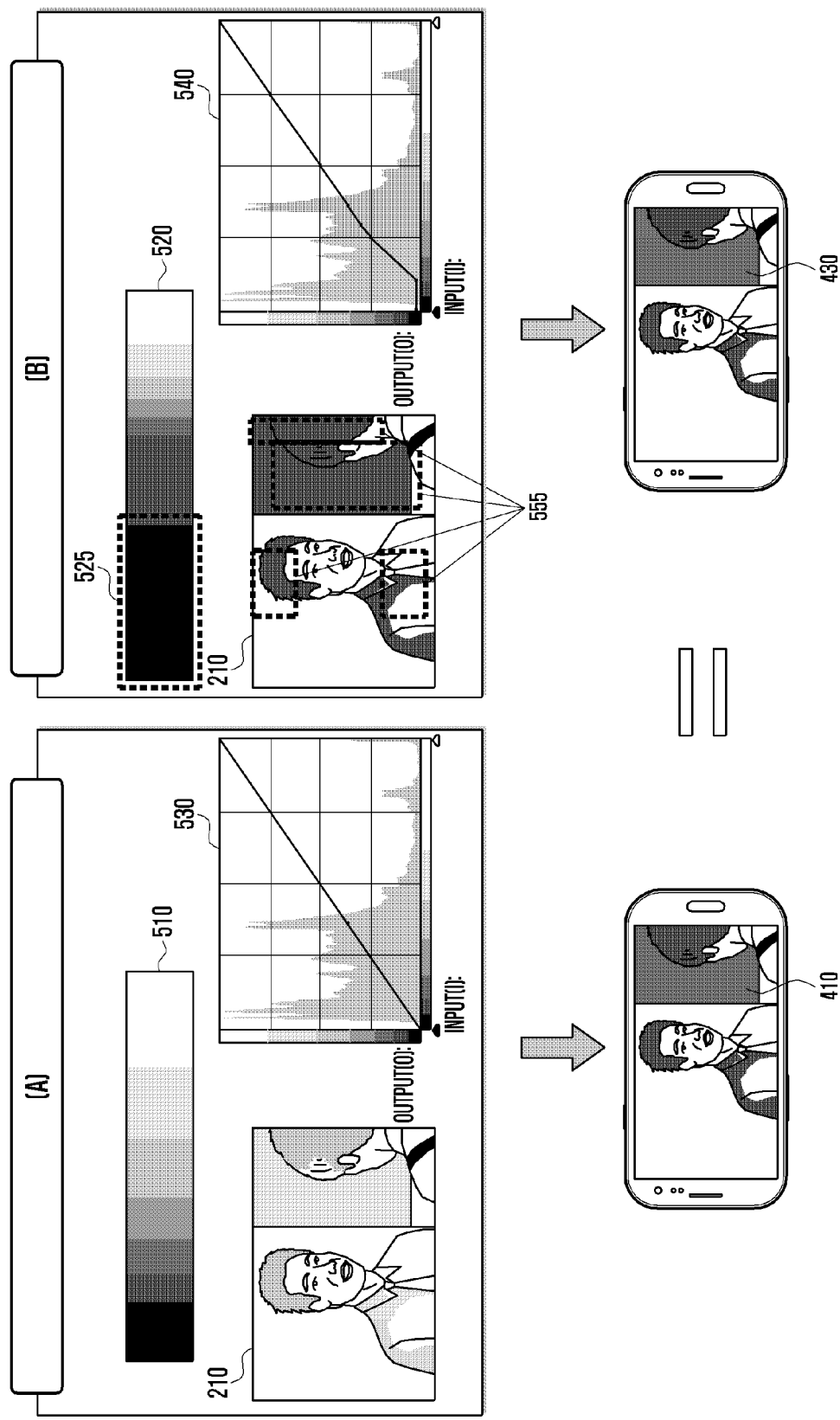

FIGS. 4 and 5 illustrate images perceived by a user as results of display operations according to an embodiment of the present invention.

Referring to FIG. 4, part (A) illustrates an original image 210 being displayed as a result image 410 on the display unit 131 without separate image processing, under conditions indicated by image processing information (e.g., at least one of illuminance and screen brightness). Part (B) illustrates an original image 210 being processed into a transformed image 250 and the transformed image 250 being displayed as a result image 430 on the display unit 131, under conditions indicated by image processing information 450 (e.g., at least one of illuminance and screen brightness).

Referring to FIG. 5, part (A) illustrates an original image 210 being viewed by a user at a default contrast ratio 510 of the electronic device under conditions indicated by given image processing information (e.g., illuminance and screen brightness). Reference numeral 530 indicates a graph representing a relationship between input contrast ratio (X-axis) and output contrast ratio (Y-axis) for the original image 210. Reference numeral 410 represents a result image viewed by the user when the original image 210 is displayed on the display unit 131 under conditions indicated by the image processing information.

When illuminance is used as image processing information in part (A), at a site with high illuminance (e.g., a sunny outdoor site), illuminance may act as noise to the image displayed on the display unit 131. Consequently, visibility of the result image 410 on the display unit 131 may be reduced due to a dark region (i.e., an imperceivable region) in the result image 410. As illustrated in part (A), the electronic device consumes current to display an imperceivable region that is not perceived by the user.

In part (B), an original image 210 is processed into a transformed image 250, based on a contrast ratio 520 corresponding to specific image processing information (e.g., illuminance and screen brightness) and the transformed image is displayed as a result image 430 on the display unit 131. Reference numeral 540 indicates a graph representing a relationship between input contrast ratio (X-axis) and output contrast ratio (Y-axis) for the original image 210. As indicated by the graph 540, regions 555 of the image corresponding to the imperceivable region 525 indicated by the image processing information (e.g., illuminance and screen brightness) are blacked out, i.e., image transformation is applied.

For example, the original image 210 may be transformed into a transformed image 250 by blacking out the regions 555 of the original image 210 (relative to the output contrast ratio) corresponding to the imperceivable region 525 (relative to the input contrast ratio), and the transformed image 250 may be output as the result image 430. Reference numeral 430 indicates a result image viewed by the user under the influence of the image processing information (e.g., illuminance and screen brightness) when the original image 210 is transformed and displayed as a transformed image 250 on the display unit 131.

When illuminance is used as image processing information in part (B), the electronic device may determine the level of image transformation to be applied to the original image 210 based on the identified level of illuminance (e.g., 20000 lux). For example, the electronic device may identify imperceivable regions 555 of the original image 210, which are not perceived by the user at the given level of illuminance. The electronic device may identify the contrast ratio 520 corresponding to the given level of illuminance and identify the imperceivable regions 555 in the original image 210 according to the contrast ratio 520. The electronic device may transform the original image 210 into a transformed image 250 by blacking out the imperceivable regions 555 of the original image 210 (e.g., corresponding pixels are turned off). The electronic device may then output the transformed image 250 as a result image 430 on the display unit 131.

As described above, in accordance with an embodiment of the present invention, only regions of images not perceived by the user (i.e., dark region on the screen (the imperceivable region 555)) are blacked out. Hence, it is difficult to maintain visibility of the result image 430 on the display unit 131 at the same level as before image transformation. In addition, application of image transformation (i.e., the blacking out the imperceivable region 555 of the original image 210) enables the electronic device to reduce current consumed in displaying the imperceivable region.

As illustrated in part (A) and part (B) of FIG. 5, although images input to the display unit 131 (e.g., original image 210 and transformed image 250) are different, the result images 410 and 430 produce the same level of visibility to the user.

In accordance with an embodiment of the present invention, regions of the original image 210 not perceived by the user (i.e., the imperceivable regions 555) under the influence of image processing information (e.g., illuminance and screen brightness) are blacked out, thereby minimizing current consumed unnecessarily in displaying the imperceivable regions 555.

Figure 6:
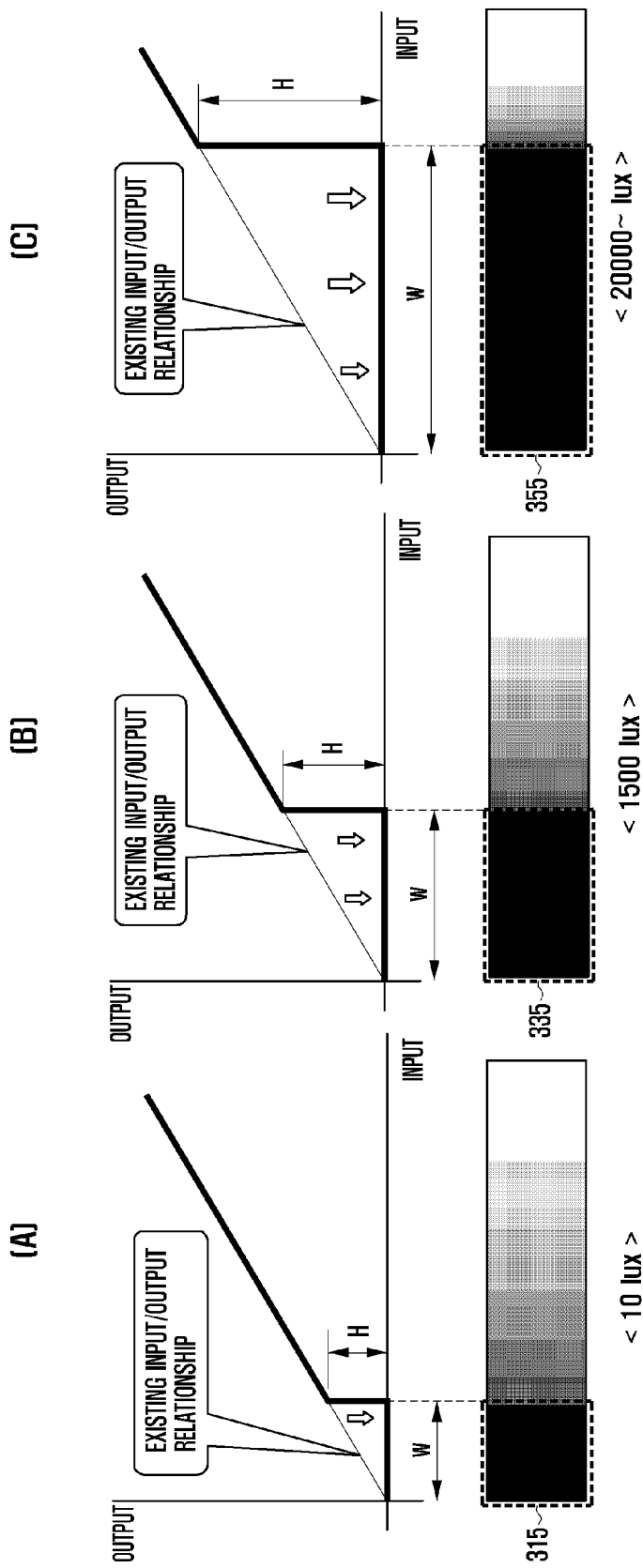
FIG. 6 illustrates relationships between input image brightness and output image brightness in imperceivable regions according to an embodiment of the present invention.

FIG. 6 illustrates relationships between input image brightness and output image brightness in imperceivable regions according to an embodiment of the present invention.

Specifically, FIG. 6 illustrates a relationship between input image brightness and output image brightness, which may be used to identify an imperceivable region to be blacked out according to the obtained image processing information.

In FIG. 6, illuminance is used as image processing information. For example, part (A) illustrates a relationship graph when the level of illuminance is 10 lux; part (B) illustrates a relationship graph when the level of illuminance is 1500 lux; and part (C) illustrates a relationship graph when the level of illuminance is 20000 lux.

As illustrated in FIG. 6, the region to be blacked out may vary according to levels of illuminance. For example, the region to be blacked out may be expanded with the increasing level of illuminance as indicated by part (A), part (B) and part (C). As the region to be blacked out varies, the relationship between input image brightness and output image brightness may also vary.

For example, in part (A) of FIG. 6, the region to be blacked out is determined at illuminance level 10 lux, as indicated by 315. For an input interval corresponding to the blackout region 315, the output brightness may be set to 0 (zero), e.g., by shutting off power supplied to pixels of the display unit 131 corresponding to the blackout region. For an input interval not corresponding to the blackout region 315, the output brightness may be produced according to the existing input/output relationship.

In part (B) of FIG. 6, the region to be blacked out is determined at illuminance level 1500 lux, as indicated by 335. For an input interval corresponding to the blackout region 335, the output brightness may be set to 0 (zero), e.g., by shutting off power supplied to pixels of the display unit 131 corresponding to the blackout region. To compare with part (A) of FIG. 6, the input interval W, whose output brightness is set to zero, is extended. That is, the region to be blacked out (i.e., the imperceivable region in an image) may expand with the increasing level of illuminance. For an input interval not corresponding to the blackout region 335, the output brightness may be produced according to the existing input/output relationship.

In part (C) of FIG. 6, the region to be blacked out is determined at illuminance level 20000 lux, as indicated by 355. For an input interval corresponding to the blackout region 355, the output brightness may be set to 0 (zero), e.g., by shutting off power supplied to pixels of the display unit 131 corresponding to the blackout region. To compare with part (B) of FIG. 6, the input interval W, whose output brightness is set to zero, is extended. That is, the region to be blacked out (i.e., the imperceivable region in the image) expands with the increasing level of illuminance. For an input interval not corresponding to the blackout region 355, the output brightness may be produced according to the existing input/output relationship.

Figure 7:
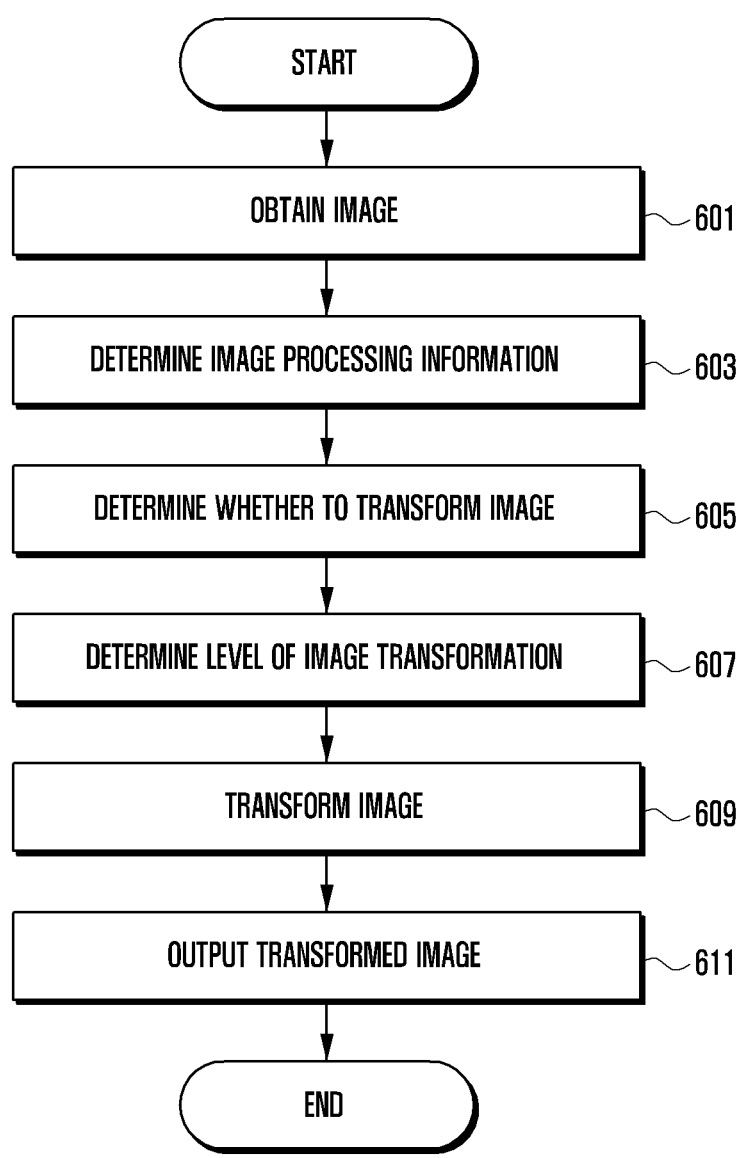
FIG. 7 is a flowchart illustrating a display method for an electronic device according to an embodiment of the present invention.

FIG. 7 is a flowchart illustrating a display method for an electronic device according to an embodiment of the present invention.

Referring to FIG. 7, in step 601, the control unit 170 obtains an image to be displayed on the display unit 131. For example, in response to a user input for selecting an image from an internal component or an external entity, the control unit 170 obtains the image selected by the user. The control unit 170 may obtain an image to be displayed from the storage unit 150 or an external device, such as an external electronic device or server connected with the electronic device through a network (such as the Internet, wireless local area network, or mobile communication network).

In step 603, the control unit 170 collects image processing information (e.g., illuminance and/or screen brightness). The image processing information may include various types of information, such as environmental information, image attribute information, and user setting information.

In step 605, the control unit 170 determines to apply image transformation to the image based on the image processing information. For example, the control unit 170 identifies the level of illuminance using an illumination sensor in response to user input for image selection and determines to apply image transformation based on the level of illuminance. The control unit 170 may identify the screen brightness preset by the user in response to user input for image selection and determine whether to apply image transformation based on the screen brightness. The control unit 170 may determine whether to apply image transformation in consideration of both illuminance and screen brightness.

The control unit 170 may determine to apply image transformation when the image processing information meets preset conditions. For example, if the level of illuminance matches a preset threshold (range or interval), the control unit 170 may determine to apply image transformation. When an imperceivable region is present under conditions indicated by the image processing information (e.g., illuminance and screen brightness), the control unit 170 may determine to apply image transformation.

In step 607, the control unit 170 determines the level of image transformation. The level of image transformation may vary according to levels of illuminance. For example, the region not perceived by user may expand with the increasing level of illuminance. As such, the control unit 170 may increase the level of image transformation (e.g., expanding the region to be blacked out) when the level of illuminance is high, and decrease the level of image transformation (e.g., reducing the region to be blacked out) when the level of illuminance is low.

The control unit 170 may vary the level of image transformation according to levels of screen brightness. The control unit 170 may determine the level of image transformation in consideration of both illuminance and screen brightness. For example, the control unit 170 may vary the level of image transformation according to a measured level of screen brightness (or a measured level of illuminance) within a preset range of illuminance (or a preset range of screen brightness).

At the same level of illuminance, the region not perceived by the user may vary according to levels of screen brightness. That is, at the same level of illuminance, the region not perceived by the user may expand with the decreasing level of screen brightness. As such, at the same level of illuminance, the control unit 170 may increase the level of image transformation (e.g., expanding the region to be blacked out), when the screen brightness is low, and may decrease the level of image transformation (e.g., reducing the region to be blacked out), when the screen brightness is high.

In step 609, the control unit 170 performs image transformation according to the level of image transformation. For example, the control unit 170 transforms the image by a large amount when the electronic device is at an outdoor site with high illuminance, and transforms the image by a small amount when the electronic device is at an indoor site with low illuminance.

To perform image transformation, the control unit 170 may further consider user setting information. For example, the control unit 170 may adjust the level of image transformation in consideration of screen brightness. The control unit 170 may decrease the level of image transformation when the screen brightness of the display unit 131 is high, and may increase the level of image transformation when the screen brightness is low.

In step 611, the control unit 170 outputs the transformed image to the display unit 131. For example, the control unit 170 may output the transformed image at the same level of visibility as that of the original image while minimizing current consumption in the imperceivable region (i.e., the blackout region) of the image not perceived by the user.

Figure 8:
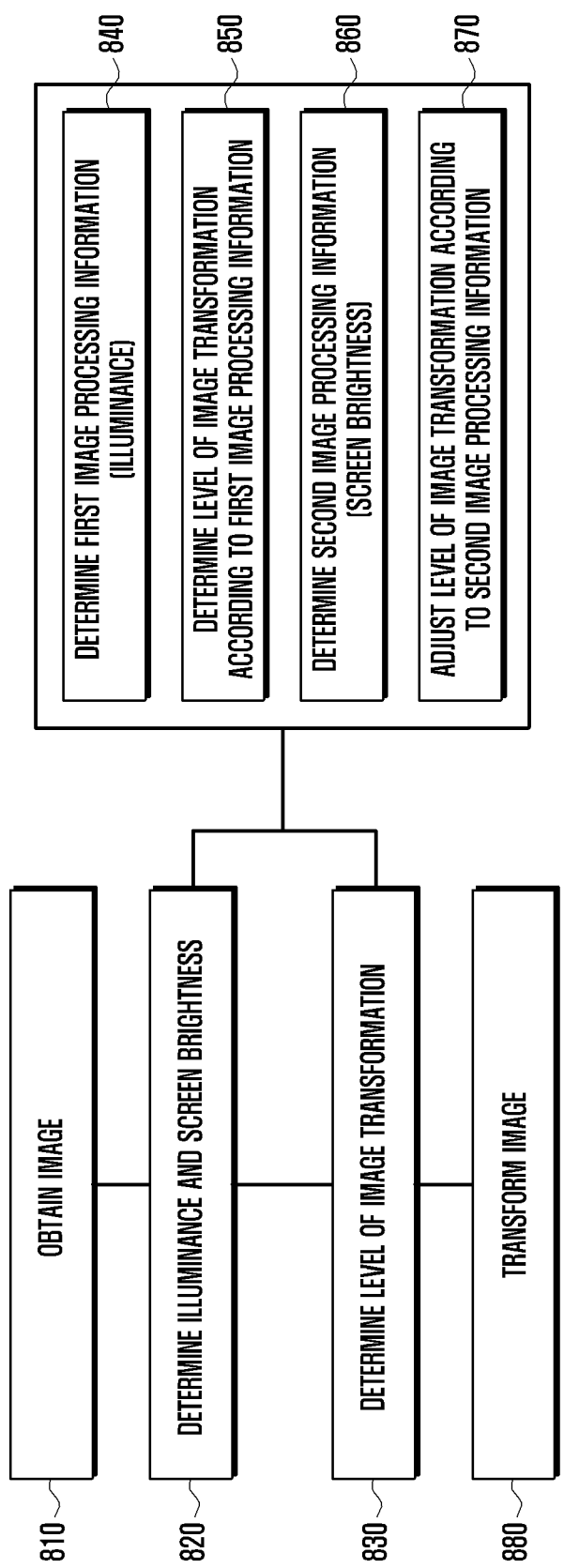
FIG. 8 illustrates a procedure to determine a level of an image transformation according to an embodiment of the present invention.

FIG. 8 illustrates a procedure to determine a level of image transformation according to an embodiment of the present invention.

Referring to FIG. 8, the control unit 170 may transform an image to be displayed on the display unit 131 based on multiple pieces of image processing information, such as first and second image processing information. Here, the first image processing information and the second image processing information may include different pieces of information. In FIG. 8, it is assumed that illuminance is used as the first image processing information and screen brightness is used as the second image processing information.

Referring to FIG. 8, in step 810, the control unit 170 obtains an image to be displayed on the display unit 131 from an internal component or an external entity, in response to user input.

In step 820, the control unit 170 obtains multiple pieces of image processing information (e.g., illuminance, screen brightness).

In step 830, the control unit 170 determines the level of image transformation to be applied to the image on the basis of the image processing information.

More specifically, in step 840, the control unit 170 determines to use illuminance as the first image processing information. In step 850, the control unit 170 determines the level of image transformation according to the first image processing information (i.e., illuminance). In step 860, the control unit 170 determines to use screen brightness as the second image processing information. In step 870, the control unit 170 adjusts the level of image transformation according to the second image processing information. That is, the control unit 170 may temporarily determine the level of image transformation according to the first image processing information and may then adjust the level of image transformation according to the second image processing information. That is, the control unit 170 may determine the optimum level of image transformation in consideration of composite image processing information including, for example, illuminance and screen brightness.

In step 880, the control unit 170 transforms the image according to the determined level of image transformation.

Figure 9A:
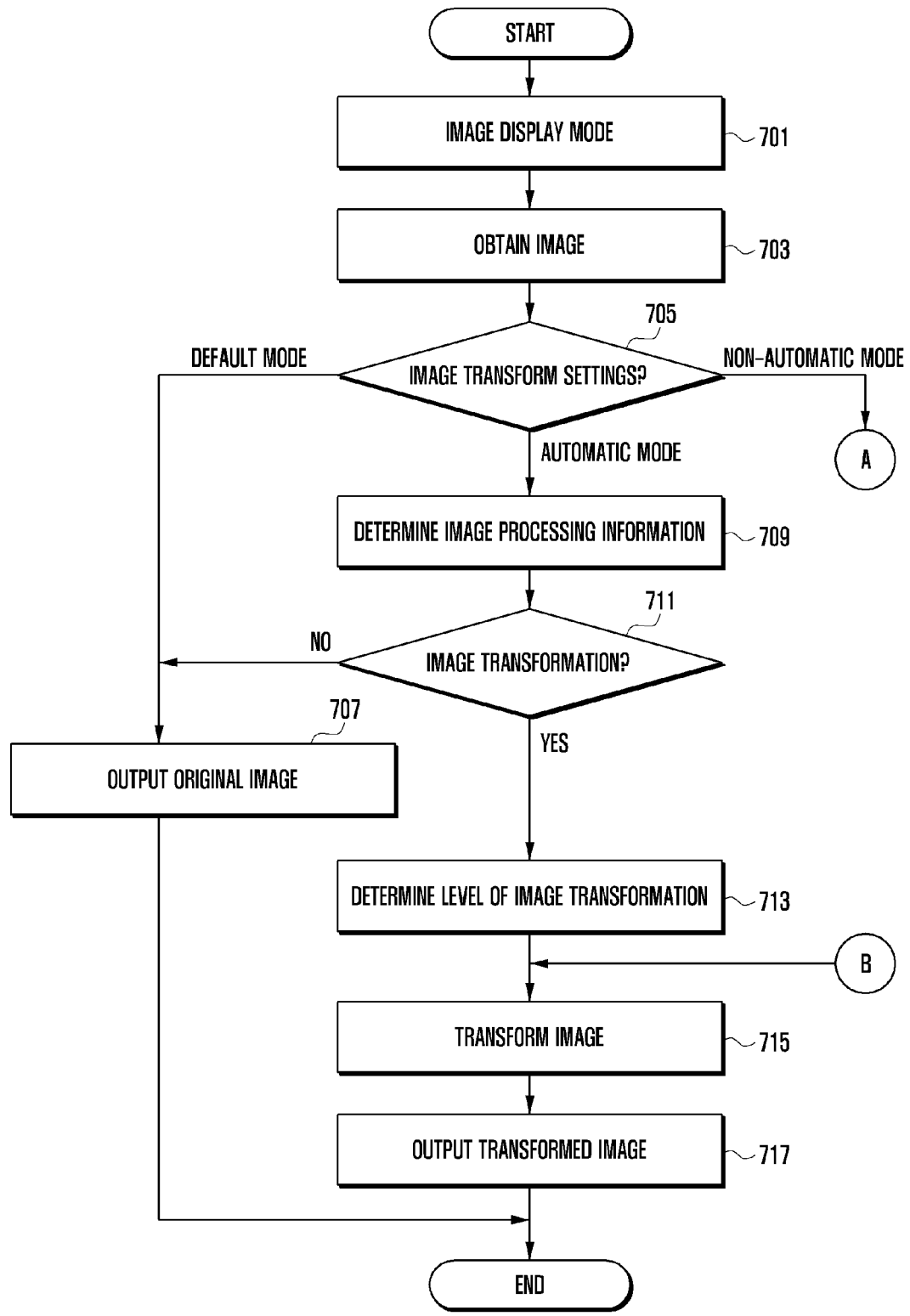
FIGS. 9A and 9B are flowcharts illustrating a display method in an electronic device according to an embodiment of the present invention.
Figure 9B:
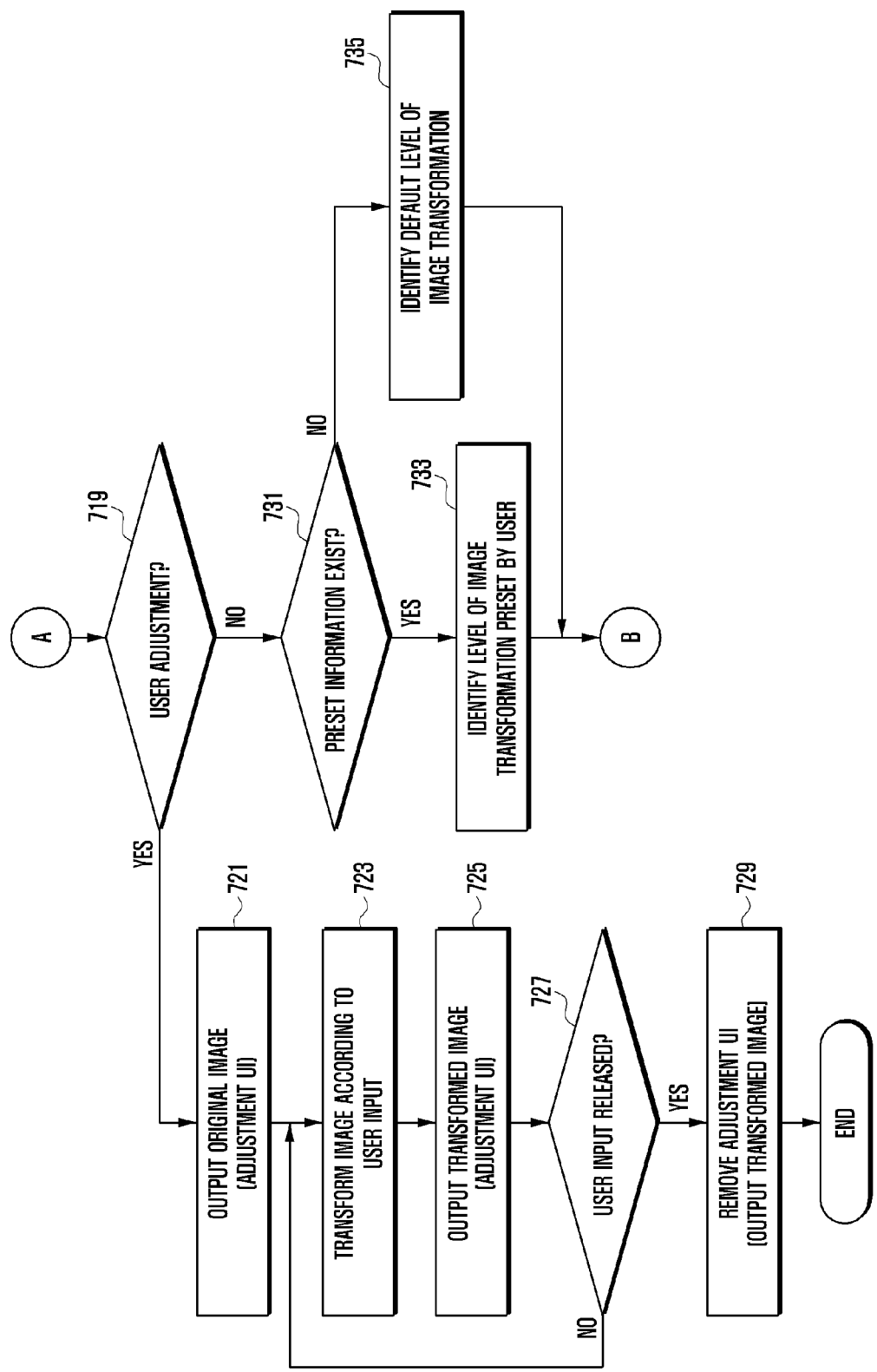

FIGS. 9A and 9B are flowcharts illustrating a display method in an electronic device according to an embodiment of the present invention.

Referring to FIGS. 9A and 9B, in step 701, the control unit 170 enters an image display mode in response to a user input for image output. For example, the user may initiate image output by selecting a still image (e.g., a photograph in a gallery), a moving image, a gaming image, or a webpage using a web browser. The control unit 170 may enter the image display mode to display images in response to user input. Here, image display mode may be associated with application execution and screen display corresponding to user input. To initiate image display mode, the control unit 170 may examine a state of an image information source (e.g., an illumination sensor) to acquire image processing information (e.g., illuminance) and turn on the image information source if necessary.

In step 703, the control unit 170 obtains an image corresponding to a user input (i.e., an image to be displayed on the display unit 131). For example, the control unit 170 may obtain an image from an internal component of the electronic device or an external entity according to user input.

In step 705, the control unit 170 examines image transform settings related to processing the image. For example, the electronic device may provide a user interface for configuring display operation (e.g., image transform options). The user interface may include various setting menus to configure whether to apply image transformation (e.g., activation or deactivation), configure whether to initiate automatic mode or non-automatic mode for image transformation, and configure the level of image transformation. Here, the level of image transformation may be set to a default setting value (e.g., average) provided by the electronic device or to a user setting value entered directly by the user.

If the image transform settings indicate a default mode in step 705, the control unit 170 outputs the original image in step 707. That is, the control unit 170 may control the display unit 131 to display the original image without image transformation.

If the image transform settings indicate automatic mode in step 705, the control unit 170 determines image processing information (e.g., illuminance and screen brightness) to be used for image transformation in step 709. The image processing information may include environmental information, image attribute information, and user setting information.

In step 711, the control unit 170 determines whether to apply image transformation to the image based on the image processing information. For example, the control unit 170 may determine if image transformation is to be performed based on the level of illuminance measured by an illumination sensor and/or a preset level of screen brightness of the display unit 131.

Upon determining not to apply image transformation in step 711, the control unit 170 outputs the original image in step 707.

Upon determining to apply image transformation in step 711, the control unit 170 determines the level of image transformation to be applied to the image in step 713. For example, the control unit 170 may determine the level of image transformation according to a contrast ratio mapped with the level of illuminance measured by an illumination sensor. The control unit 170 may raise the level of image transformation when the level of illuminance is high, and may lower the level of image transformation when the level of illuminance is low. That is, the control unit 170 may vary the region to be blacked out in the original image according to levels of illuminance. The control unit 170 may expand the imperceivable region (i.e., the region to be blacked out) in the original image when the level of illuminance is high, and may reduce the imperceivable region in the original image when the level of illuminance is low.

In step 715, the control unit 170 transforms the image according to the determine level of image transformation. For example, the control unit 170 may identify a region to be blacked out in the image based on the level of image transformation determined according to image processing information, and black out the identified region of the image.

Specifically, the control unit 170 may transform the image by a large amount (i.e., may black out a larger region of the image) when the electronic device is at an outdoor site with high illuminance, and may transform the image by a small amount (i.e., may black out a smaller region of the image) when the electronic device is at an indoor site with low illuminance. The control unit 170 may adaptively adjust the extent of the blackout region (e.g., the size and number of regions to be blacked out) according to image processing information.

In step 717, the control unit 170 displays the transformed image obtained by transforming the image on the display unit 131. For example, the control unit 170 may output the transformed image at the same level of visibility as that of the original image while minimizing current consumption in the region of the image not perceived by the user.

If the image transform settings indicate non-automatic mode in step 705, the control unit 170 determines whether a user adjustment is necessary in non-automatic mode in step 719.

If user adjustment is necessary in non-automatic mode, the control unit 170 outputs the original image in step 721. Here, the control unit 170 may output an adjustment user interface on the image being displayed on the display unit 131 to enable the user to directly adjust the level of image transformation. The adjustment user interface may be provided in an area of the screen (e.g., an upper area, a middle area, a lower area, a right area, or a left area of the screen). The adjustment user interface may be provided as a horizontal adjustment bar (e.g., a progress bar, a scroll bar, or a slide bar), or as a vertical adjustment bar.

In step 723, the control unit 170 transforms the image according to user input (e.g., a drag) through the adjustment user interface. For example, the control unit 170 may expand the region to be blacked out in the image when the user has raised the level of image transformation through the adjustment user interface, and may reduce or remove (no image transformation) the region to be blacked out in the image, when the user has lowered the level of image transformation.

In step 725, the control unit 170 outputs the transformed image in an adaptive manner. While outputting the transformed image, the control unit 170 may sustain display of the adjustment user interface.

In step 727, the control unit 170 checks whether user input is released during the display of the transformed image. Release of user input may correspond to detachment of an input means (e.g., a finger or an electronic pen) from the adjustment user interface.

When user input is not released, the method returns to step 723 to continue image transformation.

When user input is released, the control unit 170 removes the adjustment user interface from the screen in step 729. For example, when user input is released during display of the transformed image, the control unit 170 may remove the adjustment user interface from the screen while displaying the transformed image.

If user adjustment is not necessary in non-automatic mode in step 719, the control unit 170 checks whether preset information is present in relation to the level of image transformation in step 731.

If preset information is present in relation to the level of image transformation, the control unit 170 identifies the level of image transformation preset by the user in step 733. Thereafter, the method returns to step 715 to transform the image according to the level of image transformation preset by the user.

If preset information is not present in relation to the level of image transformation in step 731, the control unit 170 identifies the default level of image transformation in step 735. Thereafter, the method returns to step 715 to transform the image according to the default level of image transformation provided by the electronic device.

As described above, in various embodiments of the present invention, it is possible for an electronic device to reduce current consumption while displaying images, while maintaining visibility to a user in consideration of user perception according to image transform information (e.g., illuminance and screen brightness).

In various embodiments of the present invention, modules may be realized in software, firmware, hardware or a combination thereof. Some or all modules may be combined into one entity without change in functions of the modules. In various embodiments of the present invention, operations may be executed in sequence, by repetition, or in parallel. Some operations may be omitted or new operations may be added.

Various embodiments of the present invention may be implemented as computer programs and may be stored in various computer readable storage media. The computer readable storage media may store program instructions, data files, data structures, and combinations thereof. The program instructions may include instructions developed specifically for the embodiments of the present invention and widely known general-purpose instructions.

The computer readable storage media may include magnetic media such as a hard disk and floppy disk, optical media such as a Compact Disc Read Only Memory (CD-ROM) and Digital Versatile Disc (DVD), magneto-optical media such as a floptical disk, and memory devices such as a ROM, RAM and flash memory. The program instructions may include machine codes produced by compilers and high-level language codes executable through interpreters. Each hardware device may be replaced with one or more software modules to perform operations according to the present invention, and vice versa.

In a feature of the present invention, the electronic device having a display function and operating method therefor may selectively process or transform images to be displayed on the basis of various obtained information (such as illuminance, screen brightness and image attributes) and display the transformed images, reducing current consumption needed for image display while maintaining visibility.

In one embodiment, the electronic device may obtain various information regarding images to be displayed for image processing or transformation and divide the images into regions perceivable to the user and regions imperceivable to the user on the basis of the obtained information. For example, during display of images, the electronic device may identify regions imperceivable to the user according to illuminance and/or screen brightness. The electronic device may apply image transformation to imperceivable regions of the images to be displayed to thereby minimize current consumption in the imperceivable regions. For example, the electronic device may black out imperceivable regions not perceived by the user owing to illuminance and/or screen brightness, reducing current consumption in the imperceivable regions.

In one embodiment, the electronic device may obtain image processing information in relation to the nearby surroundings (e.g. illuminance) and/or internal settings (e.g. preset screen brightness) and determine the level of image transformation on the basis of the image processing information. The electronic device may perform image transformation (blacking out imperceivable regions of images) according to the level of image transformation, reducing current consumption needed for image display in the imperceivable regions. Hence, it is possible for the electronic device to reduce current consumption while maintaining screen visibility to the user under various environmental conditions.

In various embodiments of the present invention, the electronic device may realize an optimum environment to support a display function, so that user convenience can be enhanced and device usability, accessibility and competitiveness can be heightened. The present invention may be implemented using various electronic devices, such as a mobile communication terminal, smartphone, tablet computer, portable game console, Portable Multimedia Player (PMP), Personal Digital Assistant (PDA) and wearable device, and other devices supporting a display function.

While the present invention has been shown and described with reference to various embodiments thereof, it should be understood by those skilled in the art that many variations and modifications of the method and apparatus described herein will still fall within the spirit and scope of the present invention as defined in the appended claims and their equivalents.

What is claimed is:

1. A method for displaying an image in an electronic device, the method comprising:
   obtaining an original image to be displayed;
   determining image processing information, the image processing information including at least one of illuminance information of a current environment of the electronic device and screen brightness information of the electronic device;
   determining a level of image transformation for controlling an amount of transformation of the original image based on the image processing information;
   determining a threshold value for determining a dark region corresponding to the level of the image transformation;
   determining at least one imperceivable region to be represented as the dark region, at a level which is less than or equal to the threshold value in the image to be displayed;
   transforming the original image by blacking out the determined at least one imperceivable region in the original image; and
   displaying the transformed image including the blacked out imperceivable region, wherein blacking out the determined at least one imperceivable region in the image comprises shutting off power supplied to pixels of a display corresponding to the at least one imperceivable region.

2. The method of claim 1, wherein determining the at least one imperceivable region in the image further comprises adjusting a size of the at least one imperceivable region according to the level of image transformation.

3. The method of claim 2, wherein adjusting the size of the at least one imperceivable region comprises at least one of:
   expanding or reducing the at least one imperceivable region according to an increasing or decreasing illuminance information; and
   expanding or reducing the at least one imperceivable region according to an increasing or decreasing amount of screen brightness information.

4. The method of claim 1, further comprising:
   examining image transform settings related to processing the original image, after the original image is obtained;
   displaying the original image, when the image transform settings indicate a default mode;
   automatically transforming the original image, when the image transform settings indicate an automatic mode; and
   determining whether a user adjustment is necessary in a non-automatic mode, when the image transform settings indicate a non-automatic mode.

5. The method of claim 4, further comprising:
   providing an adjustment user interface to permit adjustment of the level of image transformation, when the user adjustment is necessary in the non-automatic mode;
   receiving a user input through the adjustment user interface;
   adjusting a level of image transformation according to the user input; and
   removing the adjustment user interface, when the user input is released from the adjustment user interface.

6. The method of claim 4, further comprising transforming the image according to a level of image transformation set by a user or by a default, when the user adjustment is not necessary in the non-automatic mode.

7. The method of claim 1, further comprising displaying a pre-stored transformed image, when a transformed image corresponding to the obtained image is pre-stored.

8. The method of claim 7, wherein displaying the transformed image comprises:
   determining whether transformed images corresponding to the original image are pre-stored;
   determining whether one of the pre-stored transformed images corresponds to the image processing information; and
   displaying the pre-stored transformed image corresponding to the image processing information.

9. The method of claim 1,
   wherein determining the at least one imperceivable region comprises:
      determining a level of image transformation to be applied to the image based on the illuminance information;
      adjusting the level of image transformation based on the screen brightness information; and
      determining the at least one imperceivable region according to the adjusted level of image transformation.

10. An electronic device, comprising:
    a display; and
    a processor configured
    to obtain an original image to be displayed on the display,
    to determine image processing information to be used for displaying the image, the image processing information including at least one of illuminance information of a current environment of the electronic device and screen brightness information of the electronic device,
    to determine a level of image transformation for controlling an amount of transformation of the original image based on the image processing information,
    to determine a threshold value for determining a dark region corresponding to the level of the image transformation, to determine at least one imperceivable region to be represented as the dark region, at a level which is less than or equal to the threshold value in the original image to be displayed, to transform the original image by blacking out the determined at least one imperceivable region in the original image by shutting off power supplied to pixels of the display corresponding to the at least one imperceivable region, and to control the display to display the transformed image including the blacked out imperceivable region.

11. The electronic device of claim 10, wherein the processor comprises:

an information acquisition module configured to determine the image processing information;

a transform determination module configured to determine whether to apply image transformation to the original image based on the image processing information; and an image processing module configured to transform the original image according to the level of image transformation, and to output the transformed image.

12. The electronic device of claim 10, wherein the processor is further configured to adjust a size of the at least one imperceivable region according to the level of image transformation.

13. The electronic device of claim 12, wherein the processor is further configured to adjust the size of the at least one imperceivable region by performing at least one of:

expanding or reducing the at least one imperceivable region according to an increasing or decreasing illuminance information, and expanding or reducing the at least one imperceivable region according to an increasing or decreasing amount of screen brightness information.

14. The electronic device of claim 10, wherein the processor is further configured to:

display the original image in a default mode, automatically transform the original image based on the image processing information and display the transformed image in an automatic mode, and transform the original image according to a user input and display the transformed image in a non-automatic mode.

15. The electronic device of claim 10, wherein the processor is further configured to find a pre-stored transformed image that corresponds to the image processing information, when transformed images corresponding to the image are pre-stored, and to display the pre-stored transformed image corresponding to the image processing information.

16. The electronic device of claim 10, wherein the display comprises an emissive display including pixels that emit light individually.

17. The electronic device of claim 10, further comprising:

an illumination sensor configured to measure an illuminance;

a communication unit configured to perform communication for the electronic device;

a storage unit configured to store one or more programs; and one or more processors to execute the one or more programs.

18. The electronic device of claim 17, wherein the one or more programs include a program that is configured to control the one or more processors to:

determine a level of image transformation to be applied to the image based on the illuminance information, adjust the level of image transformation based on the screen brightness information, and determine the at least one imperceivable region based on the adjusted level of image transformation.

19. A non-transitory computer readable storage medium for storing a program, which when executed, is configured to control an electronic device to:

obtain an original image to be displayed;

determine image processing information, the image processing information including at least one of illuminance information of a current environment of the electronic device and screen brightness information of the electronic device;

determine a level of image transformation for controlling an amount of transformation of the original image based on the image processing information;

determine a threshold value for determining a dark region corresponding to the level of the image transformation;

determine at least one imperceivable region to be represented as the dark region, at a level which is less than or equal to the threshold value in the original image;

transform the original image by blacking out the determined at least one imperceivable region in the original image; and output the transformed image including the blacked out imperceivable region, wherein blacking out the determined at least one imperceivable region in the image comprises shutting off power supplied to pixels of a display corresponding to the at least one imperceivable region.

* * * * *